(12) United States Patent
Underwood (10) Patent No.: US 11,970,223 B2
(45) Date of Patent: Apr. 30, 2024

(54) STAND UP VEHICLE

(71) Applicant: James Matthew Underwood, Kennesaw, GA (US)

(72) Inventor: James Matthew Underwood, Kennesaw, GA (US)

(*) Notice: Subject to any disclaimer, the term of this patent is extended or adjusted under 35 U.S.C. 154(b) by 581 days.

(21) Appl. No.: 17/113,504

(22) Filed: Dec. 7, 2020

(65) Prior Publication Data
US 2021/0171132 A1 Jun. 10, 2021

Related U.S. Application Data

(60) Provisional application No. 62/945,066, filed on Dec. 6, 2019.

(51) Int. Cl.
| | |
|---|---|
| *B62D 51/02* | (2006.01) |
| *B60K 17/24* | (2006.01) |
| *B62D 51/00* | (2006.01) |

(52) U.S. Cl.
CPC .............. *B62D 51/02* (2013.01); *B60K 17/24* (2013.01); *B62D 51/004* (2013.01)

(58) Field of Classification Search
CPC ...... B62D 51/02; B62D 51/004; B60K 17/24; A63C 17/12; A63C 17/011
See application file for complete search history.

(56) References Cited

U.S. PATENT DOCUMENTS

| | | | | |
|---|---|---|---|---|
| 2,933,143 A | * | 4/1960 | Robinson | B62D 13/00 280/7 |
| 3,437,161 A | * | 4/1969 | Ufford | A63C 17/015 D21/426 |
| 4,072,203 A | * | 2/1978 | Pierson | B60F 5/003 305/44 |
| 4,151,892 A | * | 5/1979 | Francken | B62D 21/183 74/478 |
| 4,645,223 A | * | 2/1987 | Grossman | A63C 17/012 280/11.28 |
| 4,861,054 A | * | 8/1989 | Spital | A63C 17/015 280/11.115 |
| 4,966,242 A | * | 10/1990 | Baillargeon | B62D 55/0655 280/421 |
| 5,224,719 A | * | 7/1993 | Goodspeed | A63C 17/015 280/11.115 |
| 5,381,870 A | * | 1/1995 | Kaufman | A63C 17/015 180/181 |
| 5,474,314 A | * | 12/1995 | Lehman | A63C 17/01 280/6.154 |

(Continued)

FOREIGN PATENT DOCUMENTS

| | | | |
|---|---|---|---|
| CA | 2319582 A1 | * | 8/1999 |
| CN | 2626557 Y | * | 7/2004 |

(Continued)

*Primary Examiner* — Jacob B Meyer (57) ABSTRACT

A vehicle for transporting a passenger in a standing position includes a frame, a rear axle assembly disposed at a rear end of the frame, a front suspension assembly disposed at a front end of the frame, a rear deck attached to the frame to accommodate a trailing foot of the passenger, a front deck attached to the frame to accommodate a leading foot of the passenger, and a driveshaft extending forward from the rear axle assembly such that the driveshaft transmits power to the rear axle assembly.

16 Claims, 10 Drawing Sheets

(56) References Cited

U.S. PATENT DOCUMENTS

| | | | | |
|---|---|---|---|---|
| 5,540,455 | A * | 7/1996 | Chambers | A63C 5/035 280/87.041 |
| 5,819,865 | A * | 10/1998 | Cowley | A63C 17/012 280/7.14 |
| 5,950,754 | A * | 9/1999 | Ondrish, Jr. | A63C 17/01 180/181 |
| 6,231,061 | B1 * | 5/2001 | Cope | B60K 17/24 180/312 |
| 6,435,290 | B1 * | 8/2002 | Justus | B62D 51/02 180/9.1 |
| 6,467,560 | B1 * | 10/2002 | Anderson | A63C 17/012 180/181 |
| 6,571,893 | B2 * | 6/2003 | De-Noor | B62D 59/00 280/492 |
| 6,695,328 | B2 * | 2/2004 | Cope | B62D 53/026 280/124.111 |
| 7,293,622 | B1 * | 11/2007 | Spital | A63C 17/12 180/181 |
| 7,905,310 | B2 * | 3/2011 | Hues | B62K 3/002 280/14.25 |
| 8,210,304 | B2 * | 7/2012 | Baldwin | A63C 17/10 180/9.1 |
| 8,540,284 | B2 * | 9/2013 | Falanga | B62M 27/02 280/87.043 |
| 8,882,145 | B1 * | 11/2014 | Worobey | B62D 51/001 280/771 |
| 9,573,045 | B2 * | 2/2017 | Lai | A63C 17/014 |
| 10,807,659 | B2 * | 10/2020 | Pikulski | B62D 51/001 |
| D911,217 | S * | 2/2021 | Kojima | D12/1 |
| 10,926,159 | B1 * | 2/2021 | Smith | A63C 17/013 |
| 11,148,038 | B2 * | 10/2021 | Ulmen | F16H 7/14 |
| 11,161,031 | B2 * | 11/2021 | Anning | A63C 17/12 |
| 11,213,739 | B2 * | 1/2022 | Anderson | A63C 17/02 |
| 2005/0139406 | A1 * | 6/2005 | McLeese | A63C 17/12 180/180 |
| 2009/0101427 | A1 * | 4/2009 | Baldwin | B62D 55/104 180/181 |
| 2014/0246257 | A1 * | 9/2014 | Jacobsen | B62D 55/0655 180/14.2 |
| 2016/0045814 | A1 * | 2/2016 | Zhou | A63C 17/12 280/221 |
| 2016/0067588 | A1 * | 3/2016 | Tan | B60L 15/00 180/181 |
| 2016/0206949 | A1 * | 7/2016 | Murphy | A63C 17/015 |
| 2020/0122017 | A1 * | 4/2020 | Paris | A63C 17/012 |
| 2021/0171132 | A1 * | 6/2021 | Underwood | B62D 21/04 |
| 2022/0118345 | A1 * | 4/2022 | Zhang | A63C 17/12 |
| 2022/0241676 | A1 * | 8/2022 | King | A63C 17/002 |

FOREIGN PATENT DOCUMENTS

| | | | | |
|---|---|---|---|---|
| CN | 104117199 A | * | 10/2014 | A63C 17/011 |
| CN | 205952169 U | * | 2/2017 | |
| CN | 205952223 U | * | 2/2017 | |
| CN | 107708817 A | * | 2/2018 | A63C 17/0086 |
| CN | 110052015 A | * | 7/2019 | A63C 17/00 |
| CN | 111228778 A | * | 6/2020 | A63C 17/011 |
| EP | 0933103 A2 | * | 8/1999 | |
| GB | 2538147 A | * | 11/2016 | A63C 17/0046 |
| GB | 2557377 A | * | 6/2018 | A63C 17/0046 |
| GB | 2557377 B | * | 1/2019 | A63C 17/0046 |
| KR | 20140035216 A | * | 3/2014 | |
| WO | WO-0205910 A1 | * | 1/2002 | A63C 17/01 |
| WO | WO-2015027272 A1 | * | 3/2015 | A63C 17/0046 |
| WO | WO-2016207062 A1 | * | 12/2016 | A63C 17/0086 |
| WO | WO-2019116277 A1 | * | 6/2019 | |
| WO | WO-2022263783 A1 | * | 12/2022 | |

* cited by examiner

STAND UP VEHICLE

CROSS REFERENCE TO RELATED APPLICATION

This application is related to and claims priority benefit from U.S. Provisional Application No. 62/945,066 ("the '066 application"), filed on Dec. 6, 2019 and entitled "OFF ROAD VEHICLE." The '066 application is hereby incorporated in its entirety by this reference.

FIELD OF THE INVENTION

The field of the invention relates to vehicles, particularly vehicles designed as a skateboard for a single standing passenger.

BACKGROUND

Modern transportation systems include compact vehicles designed for a single passenger. For example, some branches of the U.S. military are interested in a compact all-terrain vehicle capable of being deployed with airborne troops. However, conventional scooters or skateboards are too heavy and/or not sufficiently robust for off road use.

To increase comfort, maneuverability, and off road capability while minimizing weight, it may be desirable to design new electrically-powered vehicles that allow the passenger to operate the vehicle hands free to handle a weapon or other equipment.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a vehicle for transporting a passenger in a standing position comprises: a frame; a rear axle assembly disposed at a rear end of the frame; a front suspension assembly disposed at a front end of the frame; a rear deck attached to the frame to accommodate a trailing foot of the passenger; a front deck attached to the frame to accommodate a leading foot of the passenger; and a driveshaft extending forward from the rear axle assembly such that the driveshaft transmits power to the rear axle assembly.

According to certain embodiments of the present invention, a powered vehicle for transporting a passenger in a standing position comprises: a frame; a rear axle assembly disposed at a rear end of the frame with at least one rear wheel; a front suspension assembly disposed at a front end of the frame with at least one front wheel; a rear deck attached to the frame to accommodate a trailing foot of the passenger; a front deck attached to the frame to accommodate a leading foot of the passenger; and a steering mechanism controlled by input from a foot of the passenger.

According to certain embodiments of the present invention, an axle assembly for a powered vehicle comprises: a solid axle extending approximately the full width of the axle assembly; a plurality of longitudinal plate members extending along a length of the axle assembly; and a plurality of hoop plate members located perpendicular to the solid axle, wherein each of the plurality of hoop plate members comprises a plurality of notches for engaging at least one of the longitudinal plate members.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Although the illustrated embodiments shown in FIGS. 1A-5 illustrate components of various skateboard vehicles for a single passenger, the features, concepts, and functions described herein are also applicable (with potential necessary alterations for particular applications) to scooters, seated vehicles, vehicles for multiple passengers, or any other type of vehicle.

In some cases, a vehicle 1000 includes a rear axle assembly 100, a front suspension assembly 200, a front deck 11, a rear deck 12, a plurality of wheels/tires 13-16, a plurality of shocks 17-20, a longitudinal frame member 21, and a lateral frame member 22. The vehicle 1000 may also include a driveshaft 29, at least one electric motor 31, and at least one battery module 33 (see FIGS. 1A and 1B). In lieu of or in addition to the at least one electric motor 31, the vehicle 1000 may include other engines or motors including internal combustion engine(s), electric motor(s) disposed at one or more of the wheels/tires 13-16, and/or any other appropriate manner for moving the vehicle 1000.

The vehicle 1000 may be configured such that the passenger stands with his/her leading foot on the front deck 11 and his/her trailing foot on the rear deck 12. Accordingly, the passenger can ride the vehicle 1000 facing the right/starboard side (left foot is the leading foot) or can ride the vehicle 1000 facing the left/port side (right foot is the leading foot).

Although not illustrated, the vehicle 1000 may be designed to include a first binding for securing the passenger's leading shoe/boot to the front deck 11 and a second binding for securing the passenger's trailing shoe/boot to the rear deck 12. As described in greater detail below, the front deck 11 may pivot based on input from the passenger to control the steering. In other embodiments, the rear deck 12 is designed for the majority of the passenger's weight such that the passenger would sit on the rear deck and his/her feet would each be located on the front deck 11. In some embodiments, the overall suspension design for the vehicle 1000 is based on a scaled version of a trophy truck such that the suspension has large amounts of travel or articulation to allow the vehicle 1000 to move at high speeds over rough terrain with limited shock and vibration transferred to the passenger. Although the vehicle 1000 is illustrated as rear wheel drive with a locked rear differential, the vehicle 1000 may be designed with a lockable or selectable rear differential and/or with four wheel drive. The vehicle 1000 is shown with a solid axle rear and independent front suspension, but the vehicle 1000 may be designed with all independent suspension or solid axles front and rear. In some embodiments, a significant portion of the structure of the vehicle 1000 is designed and assembled from standard sheet parts without welding such that the vehicle 1000 can be shipped unassembled in a small package (i.e., a "flat pack").

Figure 1A:
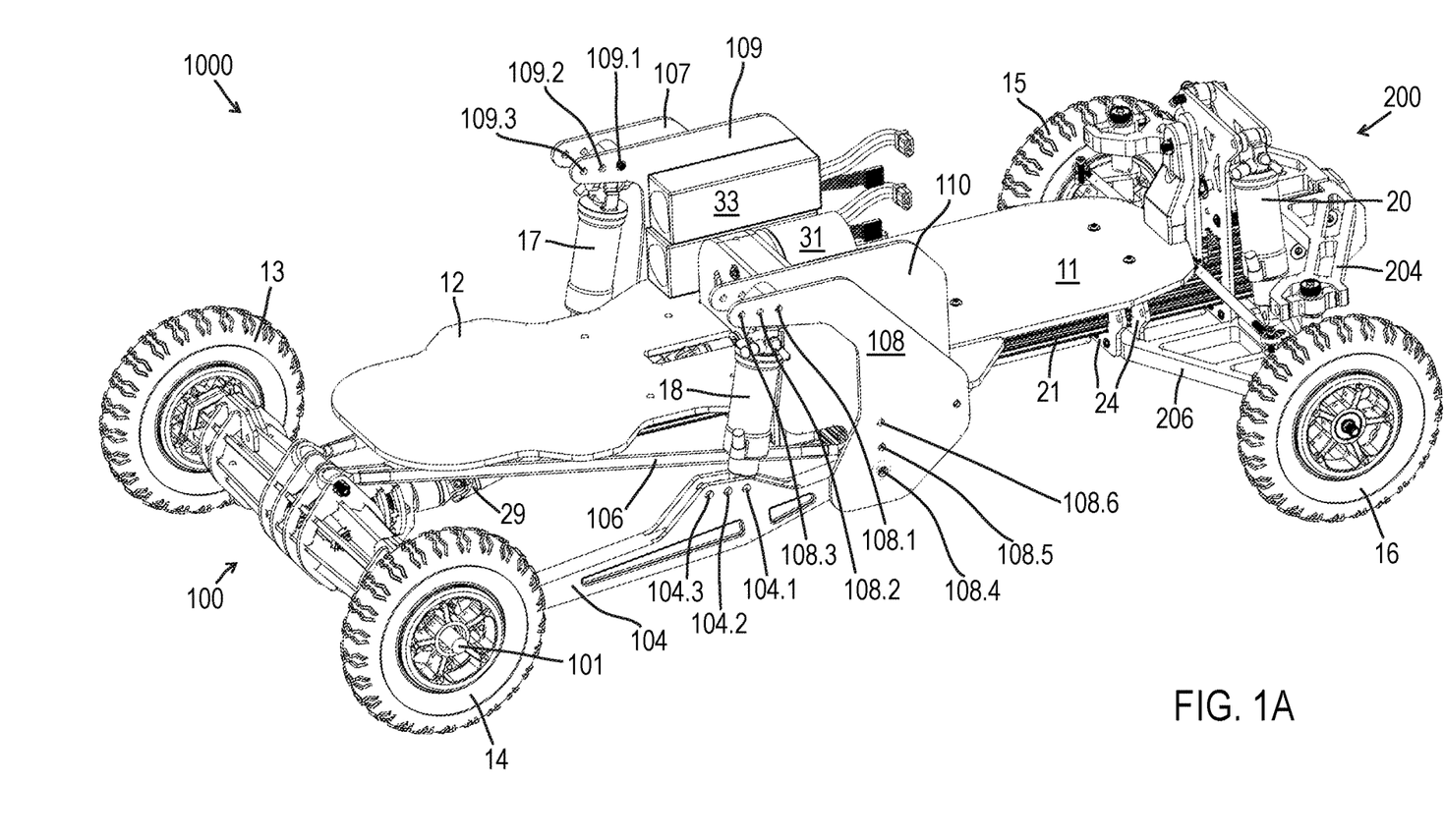
FIG. 1A is a rear right perspective view of a vehicle according to certain embodiments of the present invention.
Figure 1B:
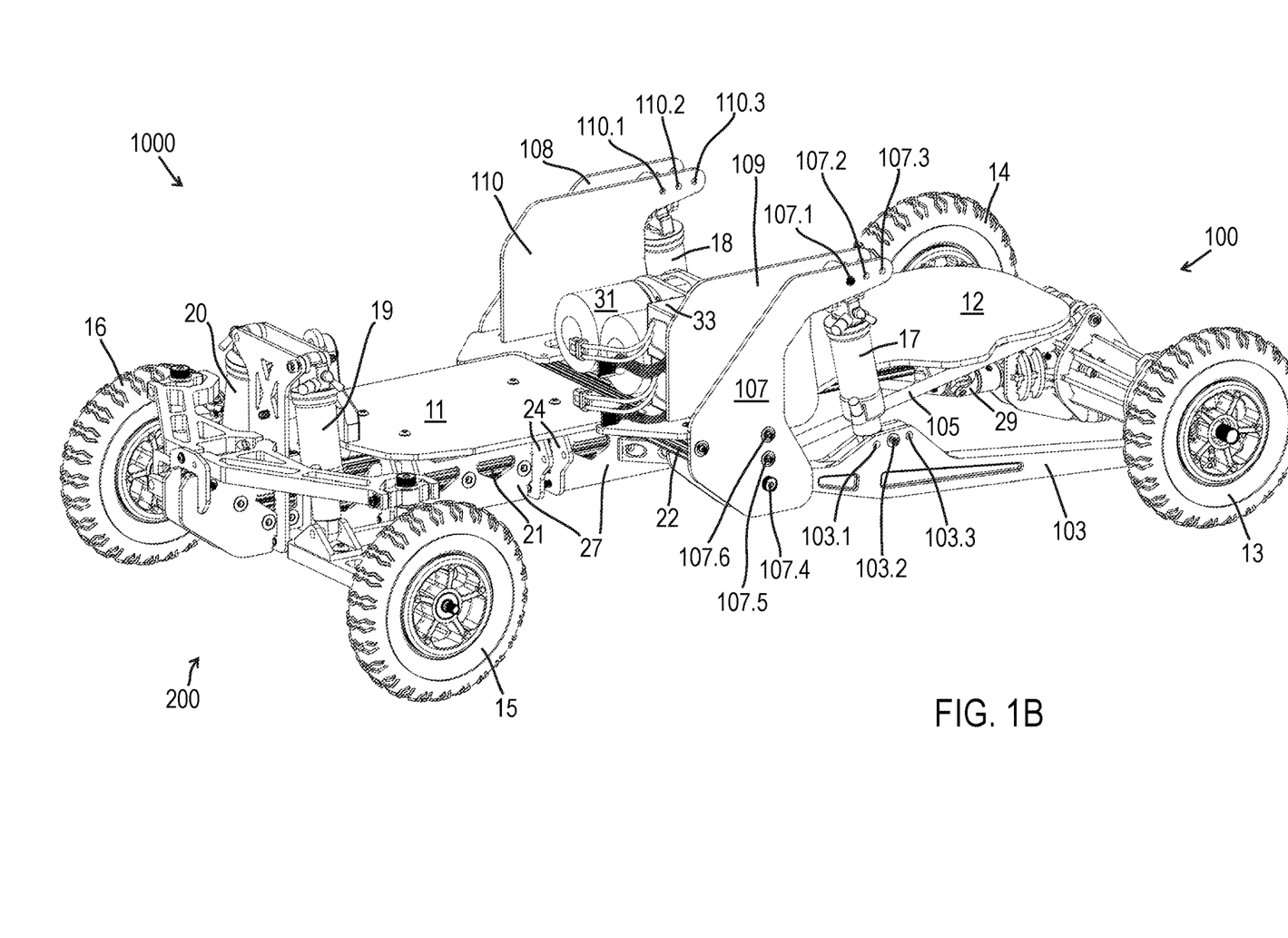
FIG. 1B is a front left perspective view of the vehicle of FIG. 1A.
Figure 2A:
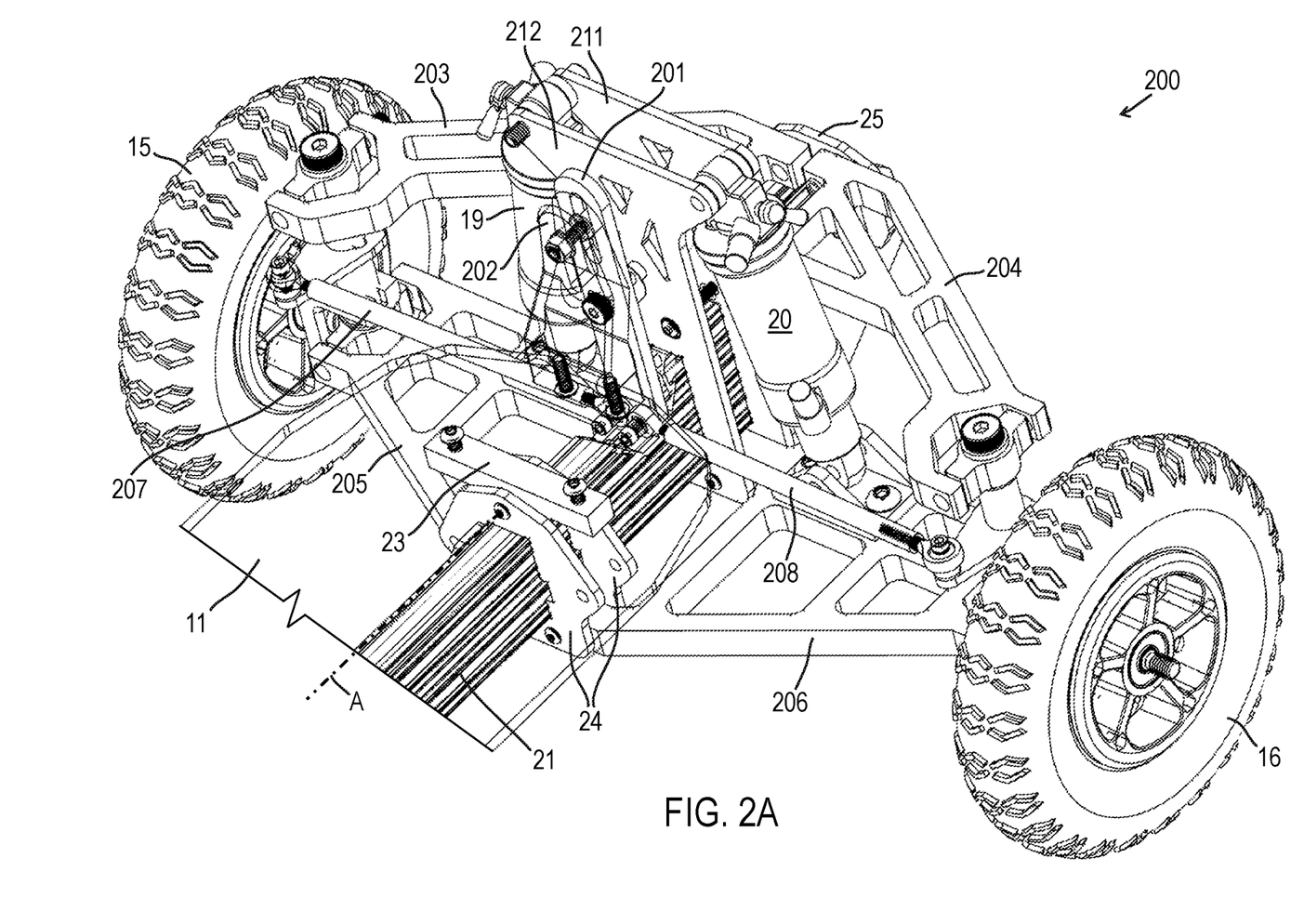
FIG. 2A is a partial front perspective view of a front suspension assembly of the vehicle of FIG. 1A.
Figure 2B:
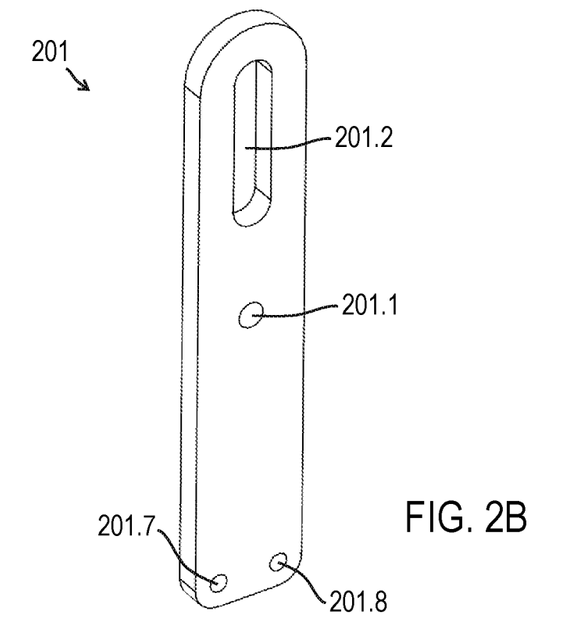
FIG. 2B is a perspective view of an adjustable steering linkage member of the front suspension assembly of FIG. 2A.
Figure 2C:
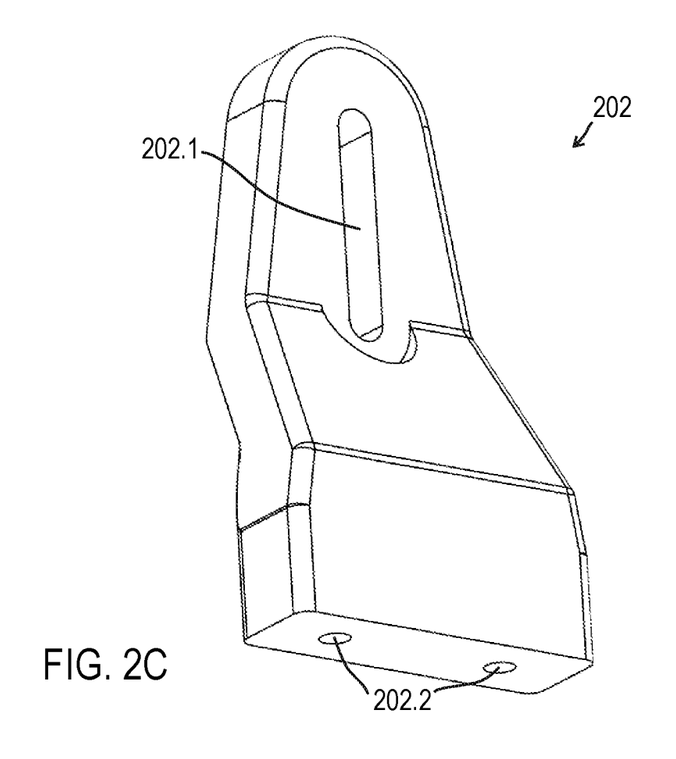
FIG. 2C is a perspective view of a steering arm of the front suspension assembly of FIG. 2A.

As shown in FIGS. 1A-2A, the front suspension assembly 200 may be an independent A-arm suspension that includes a left upper control arm 203, a right upper control arm 204, a left lower control arm 205, and a right lower control arm 206. Movement of the front suspension assembly 200 may be controlled by the front left shock 19 and the front right shock 20. The upper ends of the front shocks 19, 20 may be sandwiched between a first shock tower member 211 and a second shock tower member 212. The lower ends of the front shocks 19, 20 may be attached to the lower control arms 205, 206. The inboard side of the upper control arms 203, 204 may be attached to (i) a forward bracket 25 connected to the longitudinal frame member 21 and (ii) at least one of the first and second shock tower members 211, 212. As shown in FIG. 2A, the inboard side of the lower control arms 205, 206 may include a first pivotable attachment that is sandwiched between the first shock tower member 211 and the second shock tower member 212 and a second pivotable attachment that is sandwiched between a pair of deck plates 24. At the upper end of the deck plates 24, a pivotable deck member 23 shares a common fastener with the deck plates 24 (where the fastener extends in a fore/aft direction defining axis A) and the pivotable deck member 23 is attached to the underside of the front deck 11 (shown transparent in FIG. 2A) such that the front deck 11 can pivot about axis A. As shown in FIG. 1B, there may be a second pair of deck plates 24 that are attached to a second pivotable deck member on the underside of the front deck 11. The vehicle 1000 may include at least one frame plate 27 (see FIG. 1B) to protect the underside of longitudinal frame member 21 and to define distances between relevant components (e.g., between the two pairs of deck plates 24).

Rotation of the front deck 11 about axis A causes a steering arm 202 (shown transparent in FIG. 2A) to move with the front deck 11. In other words, the passenger can steer the vehicle 1000 using his/her leading foot to pivot the front deck 11. The steering arm 202 is attached to the front deck 11 via fasteners in holes 202.2 of the steering arm 202 (see FIG. 2C). The steering arm 202 is also attached to an upper end of an adjustable steering linkage member 201 by a fastener that is common to (i) slot 202.1 of the steering arm 202 and (ii) slot 201.2 of the adjustable steering linkage member 201. Rotation of the steering arm 202 (with the front deck 11) causes the adjustable steering linkage member 201 to pivot about hole 201.1. Accordingly, the lower end of the adjustable steering linkage member 201 (including holes 201.7 and 201.8) moves in the opposite direction of the upper end of the adjustable steering linkage member 201. As shown in FIG. 2A, the lower end of the adjustable steering linkage member 201 is attached to a left tie rod 207 and a right tie rod 208. In other words, the lower left hole 201.7 is attached to the left tie rod 207 and the lower right hole 201.8 is attached to the right tie rod 208. Movement of the fastener along the length of slot 201.2 of the adjustable steering linkage member 201 allows the passenger to adjust the amount and the sensitivity of the steering for the vehicle 1000 (i.e., based on user preference and/or conditions of the operating environment). In some embodiments, moving the fastener to the upper end of the slot 201.2 creates an approximately 1:1 ratio for movement of the front deck 11 to movement of the front wheels/tires 15, 16. Moving the fastener toward the lower end of the slot 201.2 causes more travel and greater sensitivity for the front wheels/tires 15, 16 (i.e., relatively minor movement of the front deck 11 will cause significant movement of the front wheels/tires 15, 16). Although the vehicle 1000 is shown with two front wheels/tires 15, 16, the vehicle 1000 may be designed with a single front wheel/tire for steering (in combination with either: (i) two rear wheels/tires for a 3-wheel vehicle; (ii) one rear wheel/tire for a 2-wheel vehicle; or (iii) any other appropriate configuration).

As shown in FIGS. 1A, 1B, 3A, and 3B, the rear axle assembly 100 may be attached to the vehicle 1000 in a triangulated four link arrangement that includes a left trailing arm 103, a right trailing arm 104, a left upper arm 105, and a right upper arm 106. Movement of the rear suspension may be controlled by the rear left shock 17 and the rear right shock 18. The upper end of the left rear shock 17 may be sandwiched between an outer shock tower plate 107 and an inner shock tower plate 109 and the lower end of the left rear shock 17 may be attached to an upper portion of the left trailing arm 103. The left rear shock 17 may include a conventional spring, or in some embodiments, may include a progressive spring (i.e., softer in the first part of travel to soak up small bumps, and stiffer over larger bumps). As shown in FIGS. 1A and 1B, the vehicle 1000 may be configured such that the left rear shock 17 can be mounted in a plurality of configurations. For example, the upper end of the left rear shock 17 can be attached in three different locations including: (1) at holes 107.1 and 109.1; (2) at holes 107.2 and 109.2; and (3) at holes 107.3 and 109.3. The lower end of the left rear shock 17 can also be attached in three different configurations including: (1) at hole 103.1; (2) at hole 103.2; and (3) at hole 103.3.

The upper end of the right rear shock 18 may be sandwiched between an outer shock tower plate 108 and an inner shock tower plate 110 and the lower end of the right rear shock 18 may be attached to an upper portion of the right trailing arm 104. The right rear shock 18 may include a conventional spring, or in some embodiments, may include a progressive spring (i.e., softer in the first part of travel to soak up small bumps, and stiffer over larger bumps). As shown in FIGS. 1A and 1B, the vehicle 1000 may be configured such that the right rear shock 18 can be mounted in a plurality of configurations. For example, the upper end of the right rear shock 18 can be attached in three different configurations including: (1) at holes 108.1 and 110.1; (2) at holes 108.2 and 110.2; and (3) at holes 108.3 and 110.3. The lower end of the right rear shock 18 can also be attached in three different configurations including: (1) at hole 104.1; (2) at hole 104.2; and (3) at hole 104.3.

The left trailing arm 103 includes a forward connection that is sandwiched between the outer shock tower plate 107 and the inner shock tower plate 109 and a rear connection that is attached to rear axle assembly 100 at hole 103.11 (sandwiched between outer hoop plate members 123 and 125). In some cases, the left trailing arm 103 can be attached to the static structure of the vehicle 1000 (shock tower plates 107 and 109) in three different configurations indicated by holes 107.4, 107.5, and 107.6 (the corresponding holes in inner shock tower plate 109 are not annotated for simplicity). Similarly, the right trailing arm 104 includes a forward connection that is sandwiched between the outer shock tower plate 108 and the inner shock tower plate 110 and a rear connection that is attached to rear axle assembly 100 at hole 104.11 (sandwiched between outer hoop plate members 124 and 126). In some cases, the right trailing arm 104 can be attached to the static structure of the vehicle 1000 (shock tower plates 108 and 110) in three different configurations indicated by holes 108.4, 108.5, and 108.6 (the corresponding holes in inner shock tower plate 110 are not annotated for simplicity).

In some embodiments, the left upper arm 105 includes a forward connection that is sandwiched between the inner shock tower plate 109 and a portion of the lateral frame member 22 and a rear connection that is attached to rear axle assembly 100 at hole 105.1 (sandwiched between middle hoop plate member 127 and inner hoop plate member 129). Similarly, the right upper arm 106 includes a forward connection that is sandwiched between the inner shock tower plate 110 and a portion of the lateral frame member 22 and a rear connection that is attached to rear axle assembly 100 at hole 106.1 (sandwiched between middle hoop plate member 128 and inner hoop plate member 130). In some embodiments, the holes 105.1 and 106.1 are coaxial and are arranged such that a single fastener extends through these holes. In some cases, this fastener holds a spacer between inner hoop plate member 129 and inner hoop plate member 130.

Figure 6A:
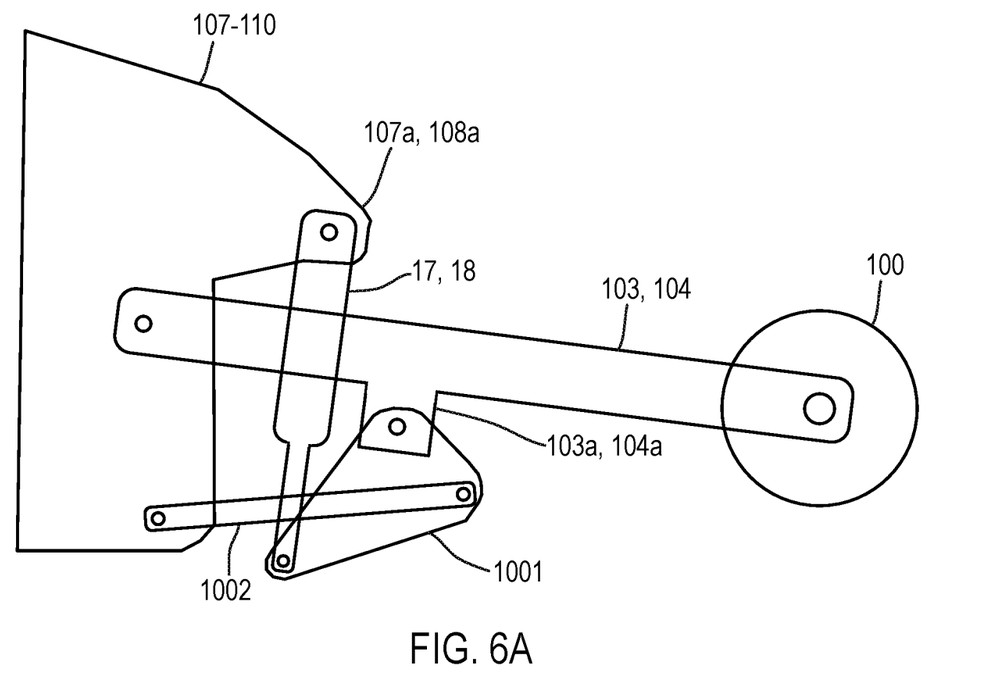
FIGS. 6A and 6B are schematic views of a rear suspension assembly of the vehicle of FIG. 1A.
Figure 6B:
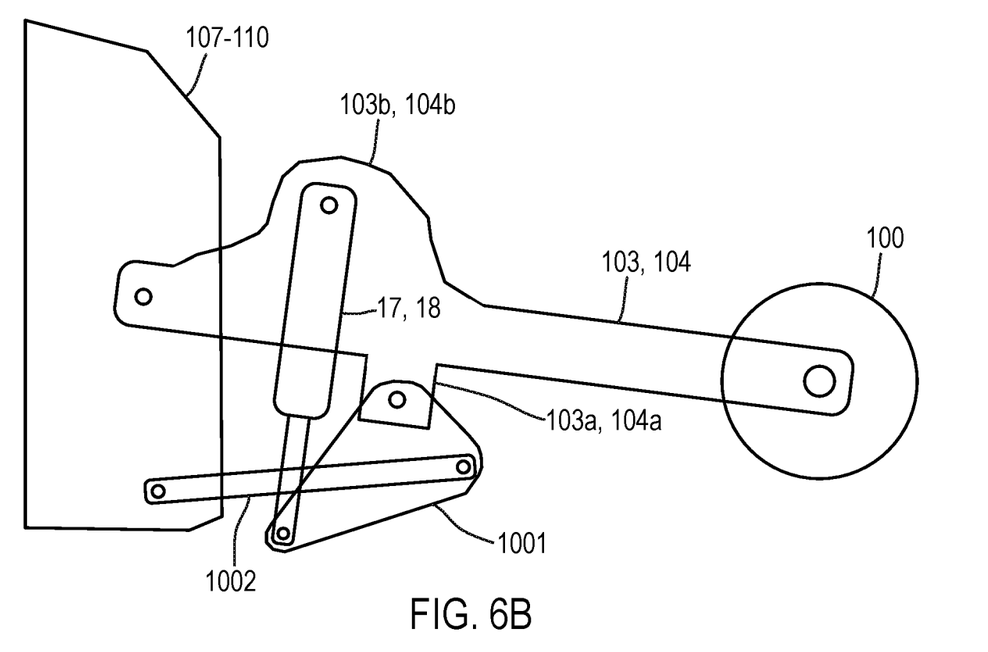

FIGS. 1A and 1B show a direct or non-linkage attachment of the rear shocks 17, 18 extending between (i) the structure of the vehicle 1000 (shock tower plates 107-110) and (ii) the moveable portion of the rear suspension (trailing arms 103, 104). However, in some embodiments, the vehicle 1000 may include a link suspension. For example, as shown in FIGS. 6A and 6B, one or both of the rear shocks 17, 18 may attach at the lower end to a shock arm 1001. The shock arm 1001 may also include a pivoting attachment to the corresponding trailing arm 103, 104 (at the relevant portion 103a, 104a) and a pivoting attachment to a first end of a shock link 1002. The second end of the shock link 1002 may include a pivoting attachment to the corresponding structure of the vehicle 1000 (shock tower plates 107-110). The shock arm 1001 and the shock link 1002 may allow the suspension to be tuned or adjusted with as much rising rate as desired by adjusting the geometry (length, shape, etc.) of the components. Varying the geometry affects leverage such that the link suspension may provide a smooth ride over small bumps and a more controlled ride over larger bumps. The rear shock 17, 18 may be smaller because the linkage can translate a small shock stroke into significant suspension travel. In some embodiments, as shown in FIG. 6A, the upper end of the rear shock 17, 18 may be attached to the static structure of the vehicle 1000 (shock tower plates 107-110). In other embodiments, as shown in FIG. 6B, the upper end of the rear shock 17, 18 may be attached to the corresponding trailing arm 103, 104 (at the relevant portion 103b, 104b). The arrangement illustrated in FIG. 6B isolates the static frame, the front suspension assembly 200, and the steering mechanisms (described above) from the shocks and stresses exerted on the rear suspension, which results in sharper, more responsive handling while also allowing improved weight distribution of the vehicle 1000.

Figure 5:
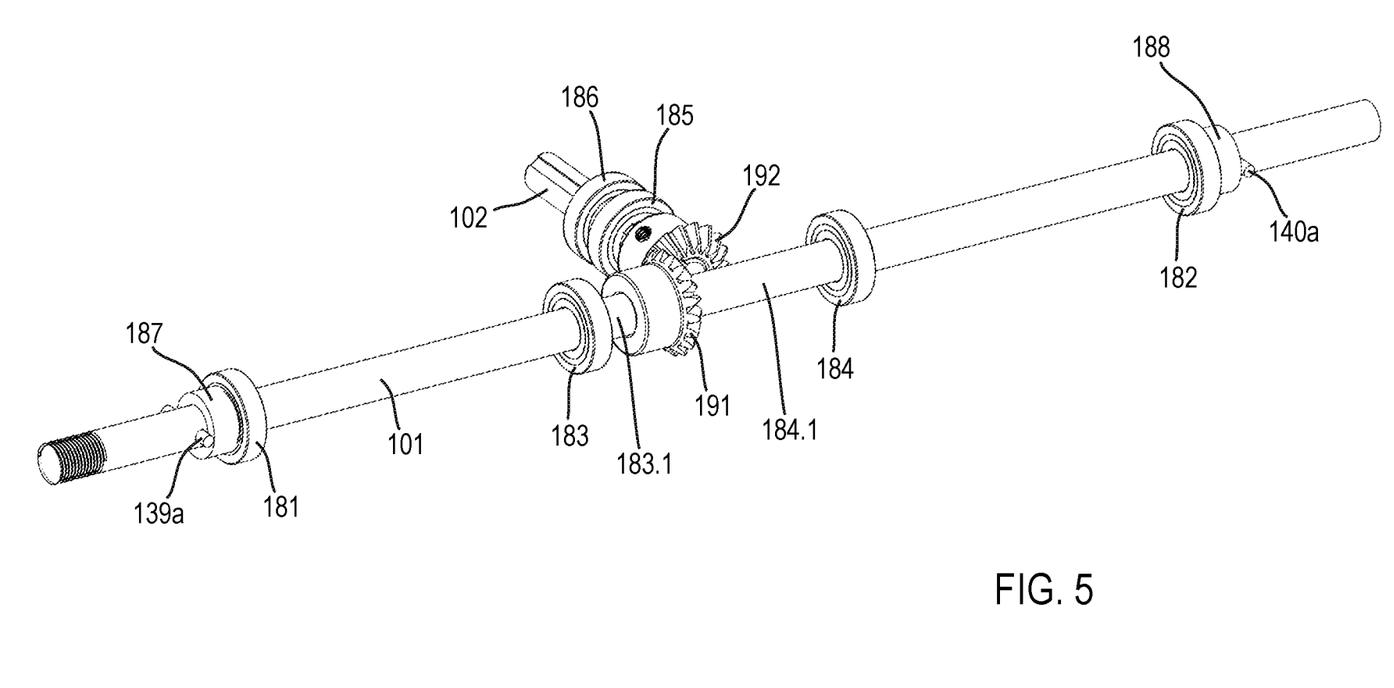
FIG. 5 is a perspective view of a rear drivetrain assembly of the vehicle of FIG. 1A.

As shown in FIG. 5, the rear drivetrain for the vehicle 1000 may include a solid axle shaft 101 and an input shaft 102. The forward end of the input shaft 102 interfaces with a driveshaft 29 (see FIGS. 1A and 'B). The driveshaft 29 transmits energy from the at least one electric motor 31 to the input shaft 102. The vehicle 1000 may include a transmission for transmitting energy from the at least one electric motor 31 to the driveshaft 29. For example, for embodiments with multiple electric motors 31, each electric motor 31 may include a spur gear that interfaces with a main gear where the main gear is constrained or attached to the driveshaft 29. As shown in FIG. 5, the input shaft 102 interfaces with at least one bearing (e.g., bearings 185 and 186) and the rear end of the input shaft 102 interfaces with a bevel gear 192. The bevel gear 192 may be secured to the input shaft 102 by engaging a set screw within a keyway in the input shaft 102 (keyway is visible in FIG. 5), by welding the bevel gear 192 to the input shaft 102, by pinning the bevel gear 192 to the input shaft 102, or by any other appropriate manner.

The solid axle shaft 101 may have a bevel gear 191 that interfaces with the bevel gear 192 of the input shaft 102 (see FIG. 5). The bevel gear 191 may be secured to the solid axle shaft 101 by engaging a set screw within a keyway in the solid axle shaft 101, by welding the bevel gear 191 to the solid axle shaft 101, by pinning the bevel gear 191 to the solid axle shaft 101, or by any other appropriate manner. The solid axle shaft 101 may interface with left center bearing 183 and right center bearing 184. In addition, the solid axle shaft 101 may interface with left outer bearing 181 and right outer bearing 182. In some embodiments, the rear drivetrain may include a spacer 183.1 between the left center bearing 183 and the bevel gear 191. In addition, the rear drivetrain may include a spacer 184.1 between the right center bearing 184 and the bevel gear 191. The rear drivetrain may include a spacer 187 between the left outer bearing 181 and the wheel lock pin 139a. The wheel lock pin 139a engages the wheel lock 139b to transfer energy from the solid axle shaft 101 to the wheel/tire 13 (see FIGS. 3A, 3B, and 4A). Similarly, the rear drivetrain may include a spacer 188 between the right outer bearing 182 and the wheel lock pin 140*a*. The wheel lock pin 140*a* engages a right hand side wheel lock to transfer energy from the solid axle shaft 101 to the wheels/tire 14 (the right hand side wheel lock is not illustrated but is similar to wheel lock 139*b*).

As shown in FIGS. 3A-4B, the rear axle assembly 100 may be designed to include a plurality of sheet components such that the components can be assembled around the drivetrain using basic hand tools. In some embodiments, the sheet components are two-dimensional sheet metal parts cut from standard size sheet metal (e.g., aluminum or steel). The basic structure of the rear axle assembly 100 includes a plurality of longitudinal plate members extending along a length of the rear axle assembly 100 and a plurality of hoop plate members. Based on this design, the rear axle assembly 100 can be assembled and disassembled without any tube members and without any welding (i.e., mechanical connections only). It should be noted that the rear axle assembly 100, the construction thereof, the method of assembly, and other relevant features may be adapted for various other vehicles, including smaller and much larger vehicles (passenger vehicles, military transport vehicles, large-scale construction equipment, etc.).

The rear axle assembly 100 is illustrated with longitudinal plate members arranged every 45° (arranged radially around the solid axle shaft 101) where 7 longitudinal plate members extend the full length of the rear axle assembly 100 and 1 longitudinal plate member is split into 2 parts on the forward side of the rear axle assembly 100 (due to the input shaft 102). Accordingly, there are 9 longitudinal plate member components. The following parts extend the full length of the rear axle assembly 100: longitudinal plate member 121*a*, longitudinal plate member 121*b*, longitudinal plate member 121*d*, longitudinal plate member 121*e*, longitudinal plate member 121*f*, longitudinal plate member 121*g*, and longitudinal plate member 121*h*. The front longitudinal plate member 121*c* is split into two parts where the front longitudinal plate member 121*c*-1 is located on the left side of the rear axle assembly 100 closer to wheel/tire 13 and the front longitudinal plate member 121*c*-2 is located on the right side of the rear axle assembly 100 closer to wheel/tire 14 (see FIGS. 3A and 3E).

Although the illustrated embodiments show longitudinal plate members every 45°, the rear axle assembly 100 may be constructed with a different number of longitudinal plate members, including either more or fewer longitudinal plate members. As one example, the rear axle assembly 100 may be constructed with longitudinal plate members every 90°. In some embodiments, the rear axle assembly 100 may be constructed without the longitudinal plate member 121*b*, the longitudinal plate member 121*d*, the longitudinal plate member 121*f*, and the longitudinal plate member 121*h* (i.e., the remaining longitudinal plate members would be arranged every 90°). Other variables, such as the thickness of the longitudinal plate members can vary (i.e., reduced thickness for each longitudinal plate member with more longitudinal plate members).

The rear axle assembly 100 is illustrated with 8 hoop plate members that includes 4 members on the left hand side of the rear axle assembly 100 and 4 members on the right hand side of the rear axle assembly 100. On the left side, the rear axle assembly 100 includes outer hoop plate member 123, outer hoop plate member 125, middle hoop plate member 127, and inner hoop plate member 129. The right side of the rear axle assembly 100 includes outer hoop plate member 124, outer hoop plate member 126, middle hoop plate member 128, and inner hoop plate member 130. As described above in the context of the rear suspension, the pair of outer hoop plate members attach to the respective rear ends of the trailing arms 103, 104 and the rear ends of the upper arms 105, 106 attach between the inner plate members. The rear end of the left trailing arm 103 is attached between outer hoop plate members 123 and 125. Similarly, the rear end of the right trailing arm 104 is attached between outer hoop plate members 124 and 126. The rear end of the upper arm 105 is attached between the middle hoop plate member 127 and inner hoop plate member 129. The rear end of the upper arm 106 is attached between the middle hoop plate member 128 and inner hoop plate member 130.

Figure 3A:
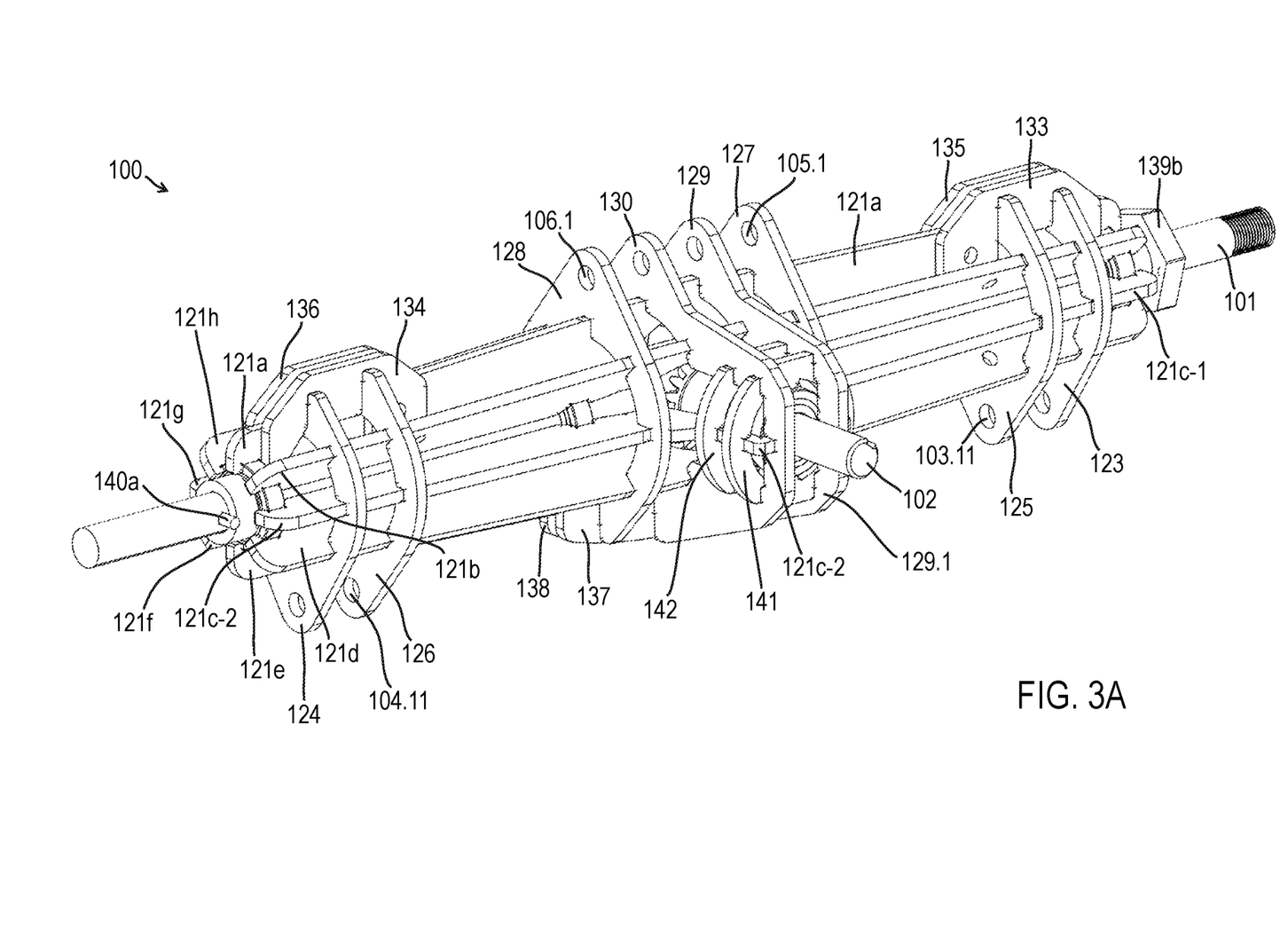
FIG. 3A is a front perspective view of a rear axle assembly of the vehicle of FIG. 1A.
Figure 3B:
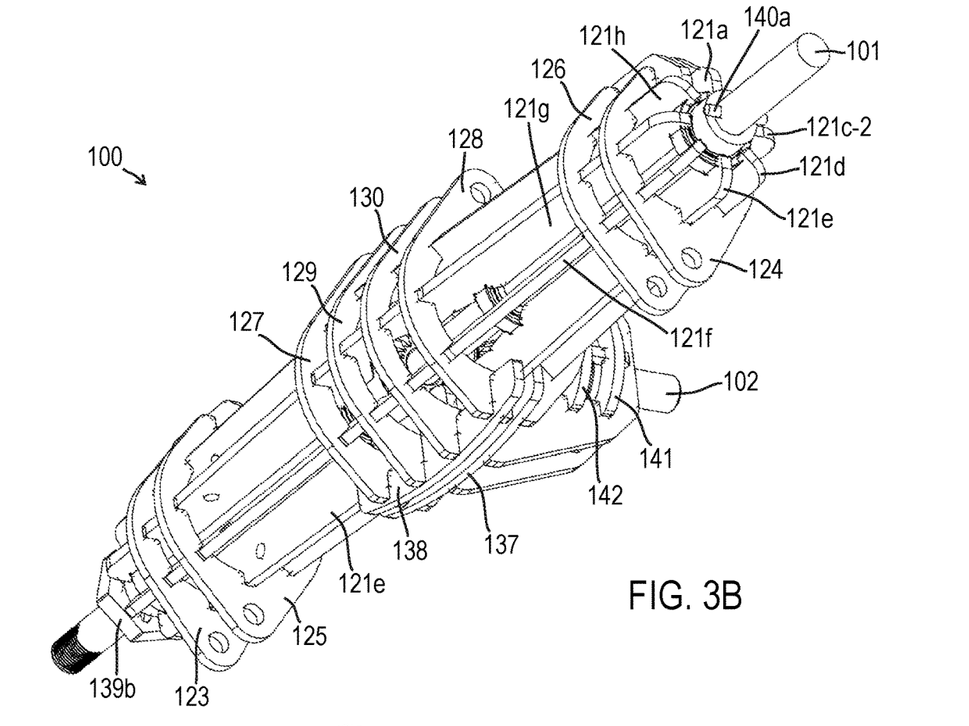
FIG. 3B is a rear perspective view of the rear axle assembly of FIG. 3A.
Figure 3C:
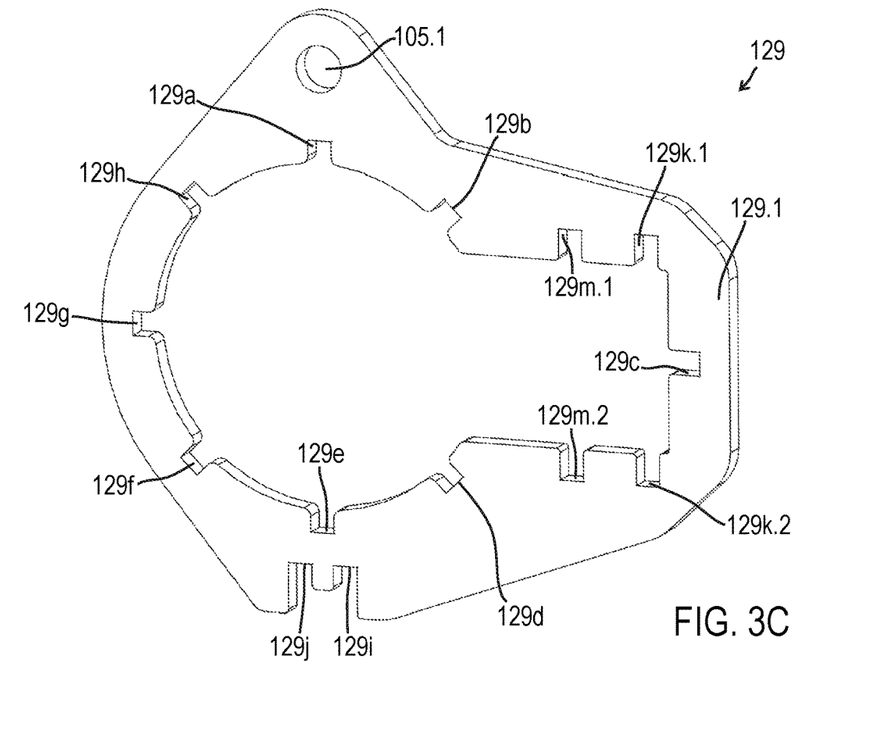
FIG. 3C is a perspective view of an inner hoop plate member of the rear axle assembly of FIG. 3A.
Figure 3D:
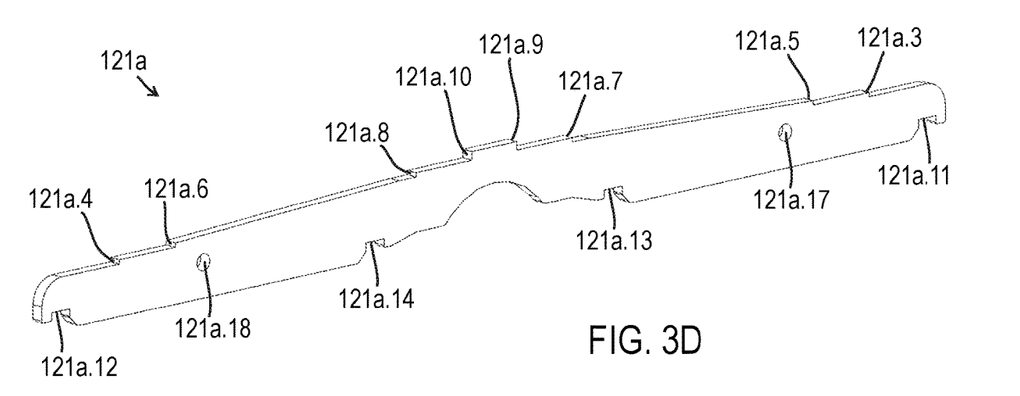
FIG. 3D is a perspective view of a longitudinal plate member of the rear axle assembly of FIG. 3A.
Figure 3E:
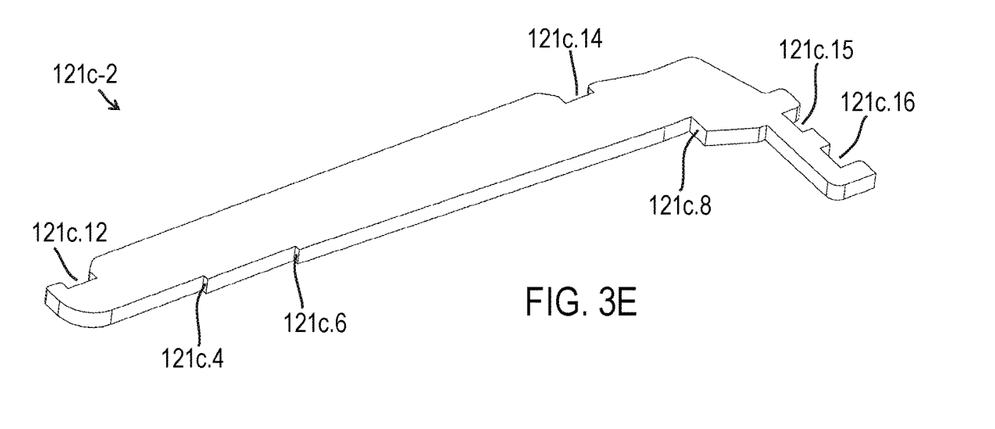
FIG. 3E is a perspective view of a longitudinal front plate member of the rear axle assembly of FIG. 3A.

FIGS. 3D and 3E show two examples of longitudinal plate members. The longitudinal plate member 121*a* is shown in FIG. 3D. In some cases, the longitudinal plate member 121*a* is substantially or exactly the same as longitudinal plate member 121*b*, longitudinal plate member 121*d*, longitudinal plate member 121*e*, longitudinal plate member 121*f*, longitudinal plate member 121*g*, and longitudinal plate member 121*h*. For example, the holes 121*a*.17, 121*a*.18 may not be necessary for longitudinal plate members other than longitudinal plate member 121*a*. Hole 121*a*.17 may be used to secure outer retaining plates 133, 135 and hole 121*a*.18 may be used to secure outer retaining plates 134, 136 (see FIG. 3A). The illustrated embodiments show holes 121*a*.17, 121*a*.18 for all of the longitudinal plate members (see FIGS. 3A and 3B). The advantage of including holes 121*a*.17, 121*a*.18 in all members is to reduce unique part numbers and to simplify assembly. However, the other similar members (longitudinal plate members 121*b* and *d-h*) do not attach to any retaining plates in these areas. Accordingly, in some embodiments, holes 121*a*.17, 121*a*.18 are only present in longitudinal plate member 121*a* and would be absent in all other members, which would reduce time for making the longitudinal plate members.

The longitudinal plate member 121*a* includes a series of notches on the outer surface and a series of recesses on the inner surface. On the left side, the outer surface of the longitudinal plate member 121*a* includes a notch 121*a*.3 that engages the outer hoop plate member 123, a notch 121*a*.5 that engages the outer hoop plate member 125, a notch 121*a*.7 that engages the middle hoop plate member 127, and a notch 121*a*.9 that engages the outer hoop plate member 129. On the right side, the outer surface of the longitudinal plate member 121*a* includes a notch 121*a*.4 that engages the outer hoop plate member 124, a notch 121*a*.6 that engages the outer hoop plate member 126, a notch 121*a*.8 that engages the middle hoop plate member 128, and a notch 121*a*.10 that engages the outer hoop plate member 130. The inner surface on the left side of the longitudinal plate member 121*a* includes a recess 121*a*.11 that engages left outer bearing 181 and a recess 121*a*.13 that engages left center bearing 183. The inner surface on the right side of the longitudinal plate member 121*a* includes a recess 121*a*.12 that engages right outer bearing 182 and a recess 121*a*.14 that engages right center bearing 184.

As shown in FIG. 3E, the longitudinal plate member 121*c*-2 includes a series of notches on the outer surface and a series of recesses on the inner surface. The notches on the outer surface of longitudinal plate member 121*c*-2 are similar to those on the right side of the other longitudinal plate members where the outer surface of the longitudinal plate member 121*a* includes a notch 121*c*.4 that engages the outer hoop plate member 124, a notch 121*c*.6 that engages the outer hoop plate member 126, and a notch 121*c*.8 that engages the middle hoop plate member 128. As discussed above, the longitudinal plate member 121*c* is split into two parts (longitudinal plate member 121c-1 and longitudinal plate member 121c-2) due to the location of the input shaft 102. Accordingly, the inner surface of longitudinal plate member 121c-2, in addition to a recess 121c.12 that engages right outer bearing 182 and a recess 121c.14 that engages right center bearing 184 (which are similar to recesses described above for longitudinal plate member 121a), includes a recess 121c.15 that engages bearing 185 and a recess 121c.16 that engages bearing 186. In some embodiments, the longitudinal plate member 121c-1 is identical to longitudinal plate member 121c-2.

FIG. 3C shows inner hoop plate member 129 as an example of a hoop plate member. Each hoop plate member includes an external hole for attachment to a rear suspension component and a series of notches on the inner surface for interfacing with the longitudinal plate members. As shown in FIG. 3C and as described above, the inner hoop plate member 129 includes hole 105.1 for attachment of the rear end of the upper arm 105. The inner surface of the inner hoop plate member 129 includes a notch 129a that engages the longitudinal plate member 121a, a notch 129b that engages the longitudinal plate member 121b, a notch 129c that engages the longitudinal plate member 121c, a notch 129d that engages the longitudinal plate member 121d, a notch 129e that engages the longitudinal plate member 121e, a notch 129f that engages the longitudinal plate member 121f, a notch 129g that engages the longitudinal plate member 121g, and a notch 129h that engages the longitudinal plate member 121h. Because the inner hoop plate member 129 is located near the interface between the solid axle shaft 101 and the input shaft 102, the inner hoop plate member 129 may include a protruding portion 129.1 that extends forward. The protruding portion 129.1 includes features such that the inner surface of the inner hoop plate member 129 also includes (i) a pair of notches 129k.1, 129k.2 for engaging input shaft hoop plate 141 and (ii) a pair of notches 129m.1, 129m.2 for engaging input shaft hoop plate 142. The four hoop members located closest to the center of the rear axle assembly 100 (hoop plate members 127-130) also interface with a pair of center retaining plates 137, 138. The outer surface of the inner hoop plate member 129 includes a notch 129i that engages the center retaining plate 137 and a notch 129j that engages the center retaining plate 138. The 4 outer hoop plate members 123-126 may include similar features for interfacing with outer retaining plates 133-136. In some embodiments, the inner hoop plate member 130 is identical to inner hoop plate member 129.

Figure 4A:
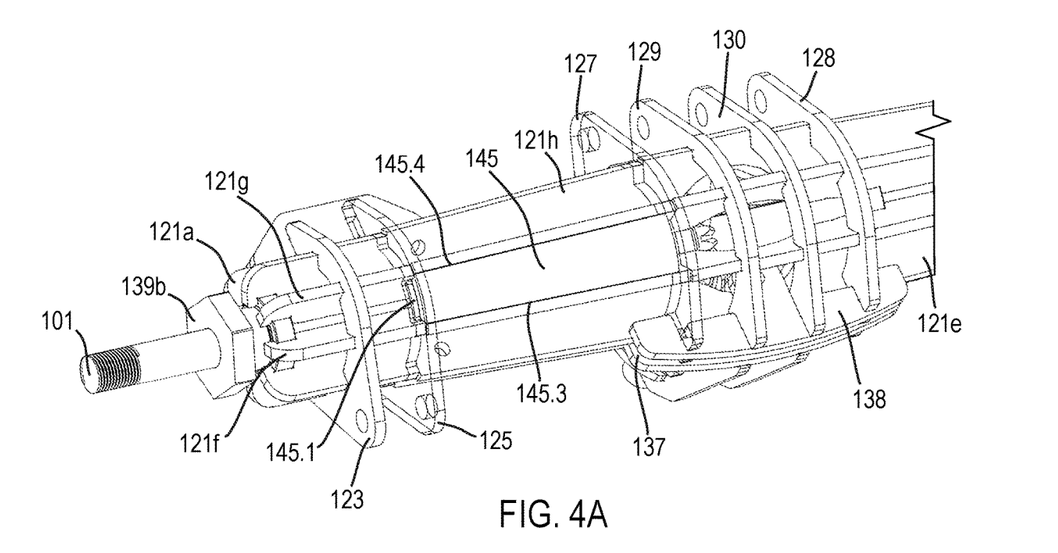
FIG. 4A is a perspective view of the rear axle assembly of FIG. 3A including a shroud member.
Figure 4B:
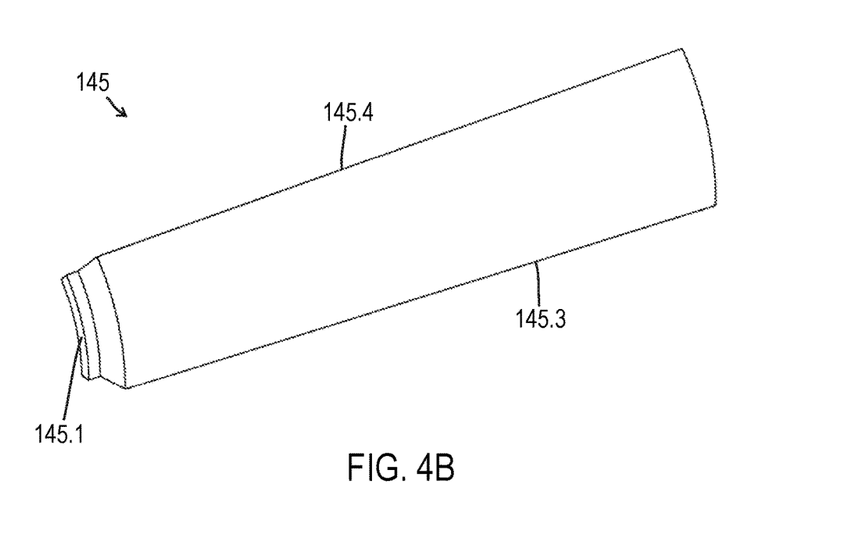
FIG. 4B is a perspective view of the shroud member of FIG. 4A.

FIGS. 3A and 3B show the rear axle assembly 100 as a skeleton structure where the internal components (drivetrain, etc.) are visible from the exterior. However, in some embodiments, the rear axle assembly 100 may include a plurality of shroud members for covering and protecting internal components from foreign objects. One exemplary shroud member 145 is shown in FIGS. 4A and 4B. The shroud member 145 may include a lip at each end (e.g., see lip 145.1) to interface with the adjacent hoop plate member. For example, lip 145.1 engages the relevant innermost surface of outer hoop plate member 125 (shown transparent in FIG. 4A) and prevents the shroud member 145 from moving outward away from the center of the rear axle assembly 100. The lower surface 145.3 and the upper surface 145.4 may be tapered to approximately match the adjacent surface of the relevant longitudinal plate member. For example, the lower surface 145.3 may be tapered to match the adjacent surface of the longitudinal plate member 121f and the upper surface 145.4 may be tapered to match the adjacent surface of the longitudinal plate member 121g.

These interfaces between the shroud member 145 and the adjacent longitudinal plate members prevent the shroud member 145 from moving inward toward the center of the rear axle assembly 100. Shroud members may be arranged to fill all of the openings of the cylindrical grid created by the plate members of the rear axle assembly 100 (i.e., all of the longitudinal plate members and the hoop plate members). The shroud members may be lightweight materials such as polymer, plastic, or any other appropriate material.

In some embodiments, the rear axle assembly 100 is designed to be assembled from a plurality of flat sheet components without any complex or expensive tools. An exemplary method for assembling the rear axle assembly 100 may include some or all of the following steps. All of the longitudinal plate members can be inserted into one of the outer hoop plate members. For example, the longitudinal plate members can be inserted into the notches of outer hoop plate member 124 to hold an approximate location and orientation (note that outer hoop plate member 124 would hold longitudinal plate member 121c-2 but not longitudinal plate member 121c-1). The drivetrain components (see FIG. 5) should be located in the appropriate locations within the longitudinal plate members. In some embodiments, the only longitudinal plate member that is different and must be inserted into a specific notch is longitudinal plate member 121c (i.e., all other longitudinal plate members are interchangeable). In some cases, the next step would be to add the left side hoop plate members onto the opposite end of the longitudinal plate members, starting with the inner hoop plate member 129. After the inner hoop plate member 129 is engaged with the appropriate mating portions of the longitudinal plate members and the input shaft hoop plates 141, 142 are in position, the middle hoop plate member 127 can be moved from the left end toward the center to the appropriate position. The longitudinal plate member 121c-1 will need to be placed in position before moving the middle hoop plate member 127 into position. After the middle hoop plate member 127 is engaged with the appropriate mating portions of the longitudinal plate members, the outer hoop plate member 125 can be moved from the left end toward the center to the appropriate position. After the outer hoop plate member 125 is engaged with the appropriate mating portions of the longitudinal plate members, the outer hoop plate member 123 can be moved from the left end toward the center to the appropriate position. After both outer hoop plate member 123 and outer hoop plate member 125 are in position, the outer retaining plates 133, 135 can be located to engage with longitudinal plate member 121a, outer hoop plate member 123, and outer hoop plate member 125.

After all of the left side hoop plate members are in position, the outer hoop plate member 124 can be removed. The process for adding the hoop plate members would then be repeated, but for the right hand side (starting with inner hoop plate member 130). After both middle hoop plate member 128 and inner hoop plate member 130 are in position, the center retaining plates 137, 138 can be located to engage with longitudinal plate member 121e and hoop plate members 127-130. Similar to the left hand side, after both outer hoop plate member 124 and outer hoop plate member 126 are in position, the outer retaining plates 134, 136 can be located to engage with longitudinal plate member 121a, outer hoop plate member 124, and outer hoop plate member 126.

In some embodiments, the assembly process begins with the longitudinal plate members arranged with the bearings 181-184 and the bevel gear 191 (along with any relevant spacers) in approximate position (without the solid axle shaft 101). At least one of the outer hoop plate member 123 and the outer hoop plate member 124 and then used to hold the longitudinal plate members temporarily in position. Subsequently, the input shaft 102 along with the bevel gear 192 and bearings 185, 186 are passed through the opening between longitudinal plate member 121*c*-1 and longitudinal plate member 121*c*-2. Due to the size of bevel gear 192, the longitudinal plate member 121*c*-1 and/or the longitudinal plate member 121*c*-2 may need to be moved to allow for clearance (such movements can be accomplished by moving the relevant outer hoop plate member 123, 124 outward). At this time, the input shaft hoop plates 141, 142 can also be moved into position. The input shaft hoop plates 141, 142 will help hold longitudinal plate member 121*c*-1 and longitudinal plate member 121*c*-2 in position. The solid axle shaft 101 can then be inserted into the bearings 181-184 (held in place by the longitudinal plate members) with careful attention to fitment between the solid axle shaft 101 and the bevel gear 191. After removal of the outer hoop plate member 123, the method for attaching the hoop plate members would be similar to the description above—starting with the inner hoop plate member 129. After the inner hoop plate member 129 is engaged with the appropriate mating portions of the longitudinal plate members and the input shaft hoop plates 141, 142 are in position, the middle hoop plate member 127 can be moved from the left end toward the center to the appropriate position. After the middle hoop plate member 127 is engaged with the appropriate mating portions of the longitudinal plate members, the outer hoop plate member 125 can be moved from the left end toward the center to the appropriate position. After the outer hoop plate member 125 is engaged with the appropriate mating portions of the longitudinal plate members, the outer hoop plate member 123 can be moved from the left end toward the center to the appropriate position. After both outer hoop plate member 123 and outer hoop plate member 125 are in position, the outer retaining plates 133, 135 can be located to engage with longitudinal plate member 121*a*, outer hoop plate member 123, and outer hoop plate member 125. The process would then be repeated for the right hand side, as described above.

Although the rear axle assembly 100 is shown within the context of a triangulated four link suspension arrangement, the rear axle assembly 100 is compatible with various other suspension arrangements. For example, the rear axle assembly 100 may attach to a first leaf or coil spring at outer retaining plates 133, 135 and a second leaf or coil spring at outer retaining plates 134, 136.

In some embodiments, throttle and braking are controlled by the at least one electric motor 31, which transmits power to the rear axle assembly 100 via driveshaft 29. The at least one electric motor 31 may be controlled via a handheld device that it connected to the at least one electric motor 31 by a wired or wireless connection. In other embodiments, the at least one electric motor 31 may be controlled via input(s) at the rear deck 12 using the passenger's trailing shoe/boot (i.e., a pedal, switch, or other relevant input).

The components of any of the vehicles 1000 described herein may be formed of materials including, but not limited to, thermoplastic, carbon composite, plastic, nylon, steel, aluminum, stainless steel, high strength aluminum alloy, other plastic or polymer materials, other metallic materials, other composite materials, or other similar materials. Moreover, the components of the vehicles 1000 may be attached to one another via suitable fasteners, which include, but are not limited to, screws, bolts, rivets, welds, co-molding, injection molding, or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A vehicle for transporting a passenger in a standing position, the vehicle comprising:
   a frame;
   a rear axle assembly disposed at a rear end of the frame;
   a front suspension assembly disposed at a front end of the frame;
   a rear deck attached to the frame to accommodate a trailing foot of the passenger;
   a front deck attached to the frame to accommodate a leading foot of the passenger; and
   a driveshaft extending forward from the rear axle assembly such that the driveshaft transmits power to the rear axle assembly,
   wherein the rear axle assembly comprises a plurality of sheet components surrounding drivetrain components.

2. The vehicle of claim 1, wherein:
   the rear axle assembly comprises a solid axle extending approximately the full width of the rear axle assembly; and
   the front suspension assembly comprises an independent suspension.

3. The vehicle of claim 1, wherein the rear axle assembly is attached to the frame in a triangulated four link arrangement that includes a left trailing arm, a right trailing arm, a left upper arm, and a right upper arm.

4. The vehicle of claim 1, wherein the plurality of sheet components comprises longitudinal plate members arranged radially around the rear axle.

5. The vehicle of claim 1, wherein the frame comprises a longitudinal frame member and a lateral frame member.

6. The vehicle of claim 1, wherein the rear deck is statically attached to the frame and is separate from the front deck.

7. The vehicle of claim 1, further comprising a steering mechanism, wherein pivoting motion of the front deck controls the steering mechanism.

8. The vehicle of claim 1, further comprising at least one electric motor, wherein power from the at least one electric motor is transferred through the driveshaft to the rear axle assembly.

9. The vehicle of claim 1, further comprising two rear wheels attached to the rear axle assembly and two front wheels attached to the front suspension assembly.

10. A powered vehicle for transporting a passenger in a standing position, the powered vehicle comprising:
    a frame;
    a rear axle assembly disposed at a rear end of the frame with at least one rear wheel;
    a front suspension assembly disposed at a front end of the frame with at least one front wheel;

a rear deck attached to the frame to accommodate a trailing foot of the passenger;
a front deck attached to the frame to accommodate a leading foot of the passenger; and
a steering mechanism controlled by input from a foot of the passenger,
wherein the rear axle assembly is attached to the frame in a triangulated four link arrangement that includes a left trailing arm, a right trailing arm, a left upper arm, and a right upper arm.

11. The powered vehicle of claim 10, further comprising a driveshaft extending forward from the rear axle assembly such that the driveshaft transmits power to the rear axle assembly.

12. The powered vehicle of claim 11, further comprising at least one electric motor, wherein power from the at least one electric motor is transferred through the driveshaft to the rear axle assembly.

13. The powered vehicle of claim 10, wherein:
the rear axle assembly comprises a solid axle extending approximately the full width of the rear axle assembly; and
the front suspension assembly comprises an independent suspension.

14. The powered vehicle of claim 10, wherein the rear axle assembly comprises a plurality of sheet components.

15. The powered vehicle of claim 10, wherein the rear deck is statically attached to the frame and is separate from the front deck.

16. The powered vehicle of claim 10, wherein the steering mechanism is mechanically connected to a pivoting motion of the front deck.

\* \* \* \* \*